United States Patent
Meyers et al.

(10) Patent No.: US 7,260,194 B1
(45) Date of Patent: Aug. 21, 2007

(54) METHOD AND SYSTEM FOR PROVIDING LONG DISTANCE SERVICE

(75) Inventors: Jerome Meyers, Douglasville, GA (US); Dean Gibson, Duluth, GA (US)

(73) Assignee: AT&T Intellectual Property, Inc., Wilmington, DE (US)

( * ) Notice: Subject to any disclaimer, the term of this patent is extended or adjusted under 35 U.S.C. 154(b) by 610 days.

(21) Appl. No.: 10/171,313

(22) Filed: Jun. 12, 2002

(51) Int. Cl.
*H04M 15/00* (2006.01)
*H04M 11/00* (2006.01)

(52) U.S. Cl. .............................. 379/114.5; 379/114.2; 405/408

(58) Field of Classification Search .......... 379/114.14, 379/114.15, 114.16, 114.17, 114.18, 114.03, 379/115.01, 115.02, 144.01, 114.2; 455/405, 455/406
See application file for complete search history.

(56) References Cited

U.S. PATENT DOCUMENTS

| 6,493,685 | B1 * | 12/2002 | Ensel et al. ................... 705/40 |
| 6,526,130 | B1 * | 2/2003 | Paschini .................. 379/93.12 |
| 7,072,455 | B2 * | 7/2006 | Diaz ..................... 379/144.01 |
| 7,107,039 | B2 * | 9/2006 | Liao et al. .................. 455/406 |
| 2001/0028705 | A1 * | 10/2001 | Adam et al. ............. 379/114.2 |
| 2001/0038033 | A1 * | 11/2001 | Habib ........................ 235/375 |
| 2002/0176553 | A1 * | 11/2002 | Aschir ..................... 379/114.2 |

OTHER PUBLICATIONS

Press Release—(BW) (0H-CONVERGYS)(CVG) Convergys Announces First for Wireless Industry; Convergent Prepaid and Postpaid Billing, Business Editors & High Tech Writers, Cinncinati—(Business Wire)—Jun. 22, 2001—Convergys Corporation (NYSE:CVG).

* cited by examiner

*Primary Examiner*—Barry Taylor
(74) *Attorney, Agent, or Firm*—Merchant & Gould

(57) ABSTRACT

A system and method of providing long distance service products to users. Post-paid debit calling cards are purchased on-line by a customer or user and the user is billed monthly, along with other service charges. The calling card account, however, is debited as it is used. Since the fee for the account is charged against an existing customer account, fraudulent purchases are reduced. In an embodiment, the purchaser is provided access to a restricted web page on the Internet using a user name and password, where the user name and password are associated with the customer's account. Once accessed, the user is able to purchase "post-paid debit calling cards." Upon sending a request to purchase such a calling card, the user is provided a toll free number and PIN. Subsequently, the purchase is logged and the fee is added to the customer's monthly bill.

28 Claims, 5 Drawing Sheets

METHOD AND SYSTEM FOR PROVIDING LONG DISTANCE SERVICE

FIELD OF THE INVENTION

This invention relates to the field of telecommunications, and in particular systems and method of providing long distance service. More particularly still, the present invention relates to the use of calling cards and methods of providing calling card services to customers.

BACKGROUND OF THE INVENTION

Long distance service is a valued service. It allows one to call outside of a geographic region. That is, most telephone service providers provide two types of service: local service and long distance service. Long distance has historically been relatively more expensive due to complexities in connecting callers from geographically remote regions.

Given the expense of long distance, many telephone service companies provide separate service options, i.e., methods of obtaining long distance service. For example, a popular and convenient service option relates to being able to call long distance from a home telephone. In essence, the home telephone service provider provides access to both local and long distance. All calls are monitored and any fees incurred are billed on a monthly basis. This "post-paid" system is highly convenient to users.

As an extension to this service, many users have post-paid "calling cards." The calling cards have a toll free number and a personal identification number (PIN) that allows the user to access long distance from a phone, other than the home phone, and have the fees billed along with the monthly bill. Such post-paid calling cards are extremely popular with parents of children living away from home because the children have long distance access and the parents are able to pay the bills. One drawback with existing post-paid calling cards is that users frequently abuse their long distance privileges. Many students or others using the calling cards will run up the fees and make it extremely difficult for the person responsible for paying the bill to fulfill their responsibility. As a result, "pre-paid" calling cards have been gaining in popularity. Pre-paid calling cards are limited long distance accounts where the purchaser provides money up front for a limited amount of long distance service, i.e., a limited number of minutes. In exchange for the money, the purchaser is provided a toll free number and a PIN number, similar to the post-paid option, which allows the purchaser to make long distance calls. Although referred to as calling "cards," the card itself is merely a way to carry the toll free number and PIN in a convenient way. In this case, however, the service provider monitors the number of minutes used, and once the pre-paid limit is reached, the service is terminated. Once terminated, the toll free number and PIN combination is no longer valid. Such a debit feature prevents users from abusing long distance. An additional benefit relates to the fact that these can be sold over the Internet.

Pre-paid calling cards suffer from at least two drawbacks, however. First, with pre-paid calling cards customers have multiple bills, one for their local service and home telephone long distance service and one for their calling card long distance service. Some customers may even receive separate bills for their local and long distance services. Second, and quite importantly, the pre-paid calling cards tend to be fraudulently acquired. For instance, since pre-paid calling cards are sold independently, any user can purchase a pre-paid calling card without any affiliation to a long distance carrier. Consequently, many fraudulent purchases have occurred, especially where the purchase has occurred over the Internet. For example, when calling cards are offered over the Internet, the typical purchase involves a purchaser requesting a calling card, the purchaser providing a credit card as a means of payment. In response to validating the credit card, a toll free number and PIN combination, i.e., a "calling card" is transmitted back to the purchaser. Unfortunately, however, the calling cards used are often stolen or are otherwise being used without permission. Since there is no address or name of the actual purchaser, either the credit card company or the long distance carrier is forced to pay for these losses.

It is with respect to these and other considerations that the present invention has been made.

SUMMARY OF THE INVENTION

The present invention relates to a system and method of providing a post-paid debit calling card account that can be purchased on-line by a customer, yet the fee occurs on the customer's monthly bill. The calling card account, however, is debited as it is used so that abuse is curtailed. Further, since the fee for the account is charged against an existing customer account, fraudulent purchases are reduced. In an embodiment, the purchaser is provided or sets up an on-line account wherein the customer accesses a restricted web page using a user name and password, where the user name and password are associated with the customer's account. Once accessed, the user is able to purchase "post-paid debit calling cards." Upon sending a request to purchase such a calling card, the user is provided calling card information, which may include, for example a platform access phone number, such as a toll free number, and a personal identification number (PIN). Subsequently, the purchase is logged and the fee is added to the customer's monthly bill.

In accordance with a particular embodiment, the present invention relates to a system and method of providing long distance telephone service to a user that involves receiving a request to purchase long distance telephone service, the long distance service comprising a post-paid debit account. Upon receiving the request the invention receives user identification information such that determination may be made as to whether the user is trustworthy. Upon determining that the user is trustworthy, the invention provides the user with long distance service access information, such as post-paid debit account information and then bills the user in a predetermined manner for the long distance service. The invention typically deems the user as trustworthy if the user has an existing account.

With respect to other embodiments, the predetermined method or manner for billing the user may comprise sending a bill to a physical location, such as an office or home or the bill may be sent to the user via email. In accordance with certain aspects, the post-paid debit account information relates to a platform access number and a personal identification number combination.

In accordance with other aspects, the present invention relates to a computer system for providing long distance service to a user in response to a received request wherein the system has a server layer for receiving a request to access a secure link, the request having client identification information. The server layer also has a determination module for determining whether the client is trustworthy and a process order module for processing an order for a debit long distance service product upon determining the client is trustworthy, wherein the client is deemed trustworthy upon identifying a pre-existing account having a predetermined method of billing. The server layer also has a communication module for communicating a request to a platform layer, the platform layer providing the debit long distance service product to the server layer in response to the request. Further, the server layer also has a billing module for billing the pre-existing account according the predetermined method of billing, such as by sending a physical bill to a physical location or by sending an electronic bill either by providing access to the account online and/or by providing an emailed electronic version of the bill, among others. Additionally, the debit long distance telephone service product may comprise a platform access number, such as a toll free number and a personal identification number combination.

The invention may be implemented as a computer process, a computing system or as an article of manufacture, such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its improvements can be obtained by reference to the accompanying drawings, which are briefly summarized below, to the following detailed description of presently preferred embodiments of the invention and to the appended claims.

DETAILED DESCRIPTION OF THE INVENTION

Figure 1:
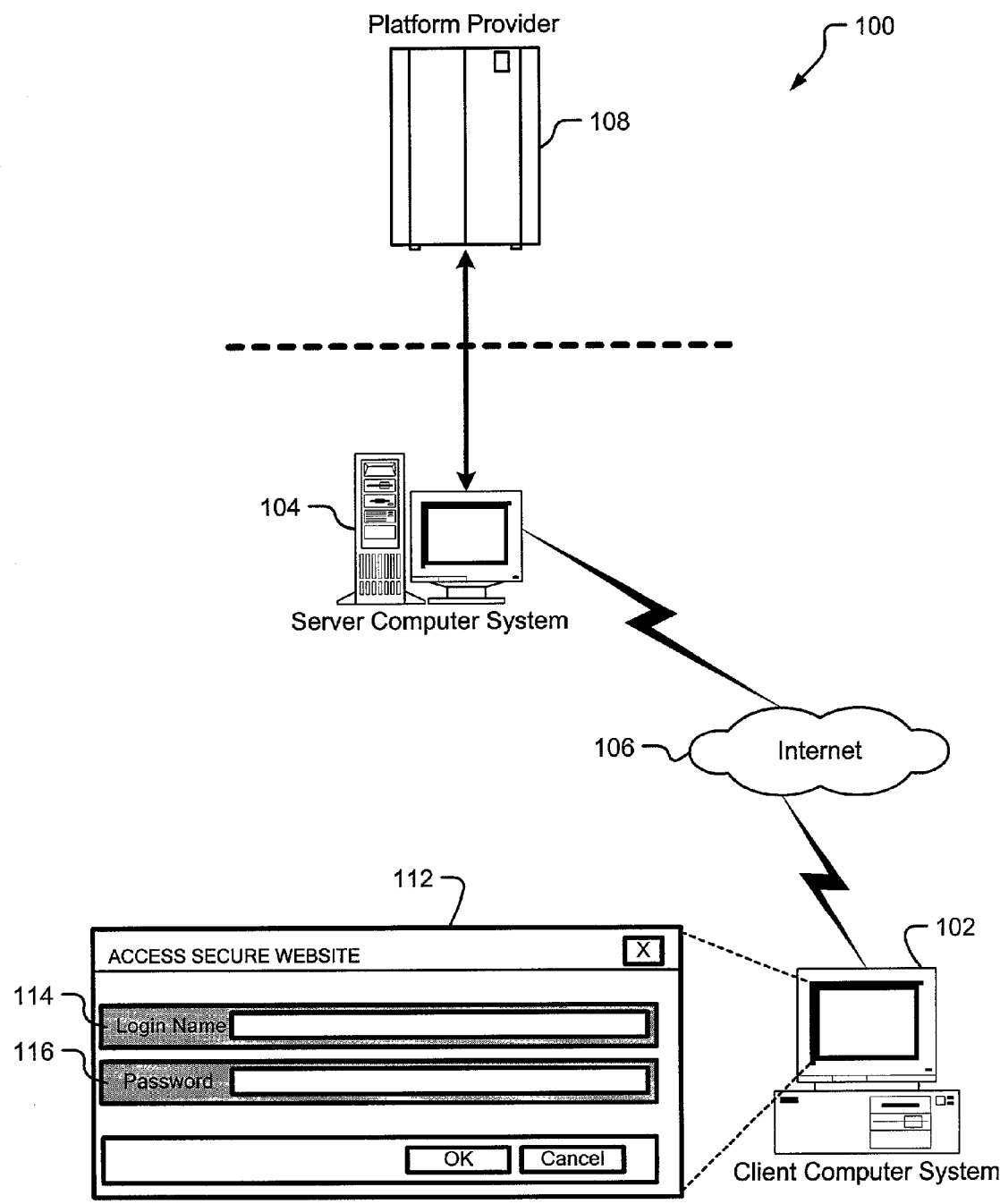
FIG. 1 illustrates a distributed network system that incorporates aspects of the present invention.

A distributed environment 100 incorporating aspects of the present invention is shown in FIG. 1. The environment 100 relates to a distributed network having at least one client computer system 102 that communicates with at least one server computer system 104. The client computer system 102 and the server computer system 104 communicate using a communication protocol over the distributed network. In one embodiment, the communication utilizes the Internet 106. The server computer system 104, in turn, communicates with a platform provider 108, which maintains and manages account information for long distance services.

Through the server computer system 104, the client computer system accesses a secure communications link, e.g., a secure website or a secure web page. Accessing the secure link provides the client computer system the ability to request long-distance service options, such as purchase a post-paid debit calling card. In return, through the secure link, the server computer system 104 and the platform provider can provide long-distance service information, including platform access information, such as a toll-free number and personal identification number (PIN) combination, to the client computer system. In alternative embodiments, since the access is not required to be toll free, general platform access is provided through such methods as having the user dial "1+" and the number which would cause the user to be routed to the prepaid platform and a look-up on the ANI is performed by the platform for balance verification as discussed below. The secure nature of the link provides the server 104 and the platform 108 the ability to verify client information and, in turn, provide services to the client, i.e., the user of the client computer system 102, in an automated manner that minimizes the risk of fraud.

In an embodiment, the client computer system 102 executes a browser module (hereinafter browser) as an application or as part of the operating system for retrieving or browsing electronic documents from a remote computer network, such as server computer system 104. The computer system 102 connects to the computer network 104 over a telephone line with a modem (not shown) or some other physical connection, such as a network interface, an ISDN, T1 or other high speed telephone line, a television cable, a satellite link, an optical fiber network, an Ethernet or local area network technology wire and adapter card, radio or optical transmission devices, etc. The invention can alternatively be embodied in a browsing environment for other public or private computer networks, such as computer network of a commercial on line service or an internal corporate local area network (LAN) or like computer networks.

The browser module is used to access the secure link, such as a secure web page or website. To access the link, the user of client system 102 specifies a URL related to the particular web site, such as by entering a URL character string with a keyboard, by selecting a hyperlink specifying the URL in an HTML document currently being displayed in the browser display, or by selecting a URL from a list provided by the browser, among others. In response to the entered URL the browser generates a request command for the URL and transmits the request on the Internet 106 for the website using conventional Internet protocols, such as the Hypertext Transport Protocol (HTTP). Consequently, the browser may display a verification window, such as window 112, in a conventional operating system graphical user interface.

The window 112 provides the user of the client computer system the ability to enter predetermined client identification information, such as a login name and password, in areas 114 and 116 respectively. The information may then be supplied to the server computer system 104 for verification. Upon verification, the server computer system may provide access to a secure web page that includes account information for the user and provides the ability to purchase a "post-paid debit" calling card. Billable activity on the secure web page, such as purchases made, is then billed to the user's account. In an embodiment, the web page is associated with an existing client, having a physical mailing address, such as a home or an office. In this embodiment, the association with a home or office address generally reduces the fraudulent activity since users must have a verifiable account to purchase items on the web page.

Figure 2:
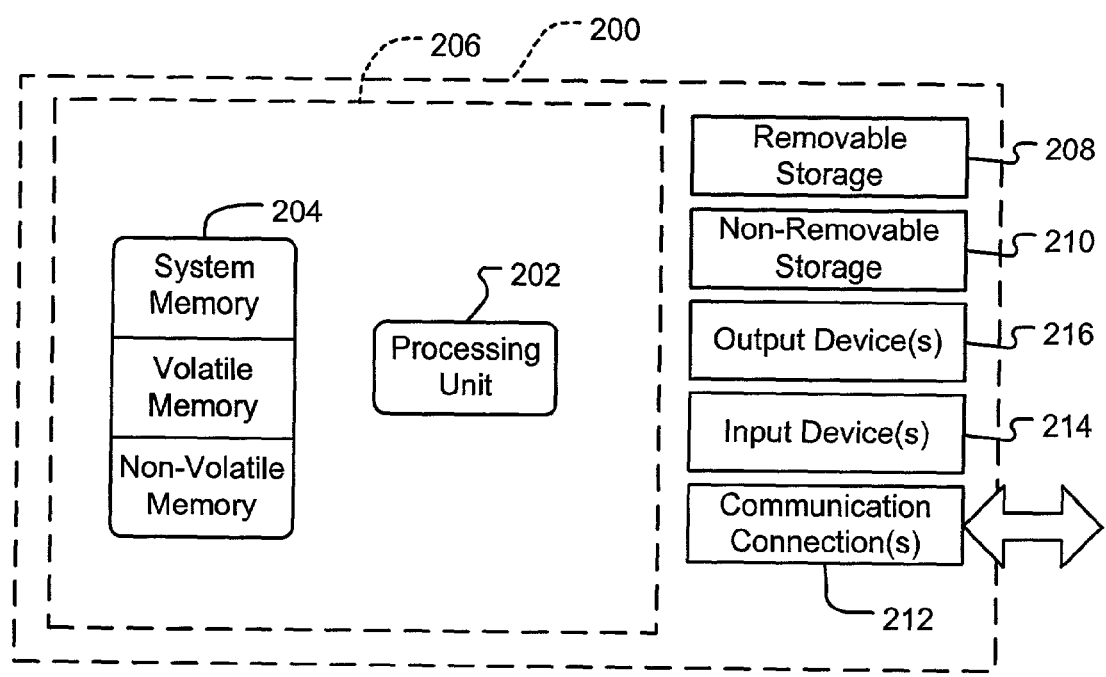
FIG. 2 illustrates a computer system that may be used according to particular aspects of the present invention.

The computer systems, such as 102 and 104 may be represented by the computer system 200 shown in FIG. 2. The system 200 has at least one processor 202 and a memory 204. In its most basic configuration, computing system 200 is illustrated in FIG. 2 by dashed line 206 encompassing the processor 202 and the memory 204. Additionally, system 200 may also include additional storage (removable and/or non-removable) including, but not limited to, magnetic or optical disks or tape. Such additional storage is illustrated in FIG. 2 by removable storage 208 and non-removable storage 210. Computer storage media, such as memory 204, removable storage 208 or non-removable storage 210 includes volatile and nonvolatile, removable and non-removable media implemented in any method or technology for storage of information such as computer readable instructions, data structures, program modules or other data. Memory 204, removable storage 208 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by system 200. Any such computer storage media may be part of system 200. Depending on the configuration and type of computing device, memory 204 may be volatile, non-volatile or some combination of the two.

System 200 may also contain communications connection(s) 212 that allow the device to communicate with other devices. Additionally, system 200 may have input device(s) 214 such as keyboard, mouse, pen, voice input device, touch input device, etc. Output device(s) 216 such as a display, speakers, printer, etc. may also be included. All these devices are well known in the art and need not be discussed at length here.

Computer system 200 typically includes at least some form of computer readable media. Computer readable media can be any available media that can be accessed by system 200. By way of example, and not limitation, computer readable media may comprise computer storage media and communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Figure 3:
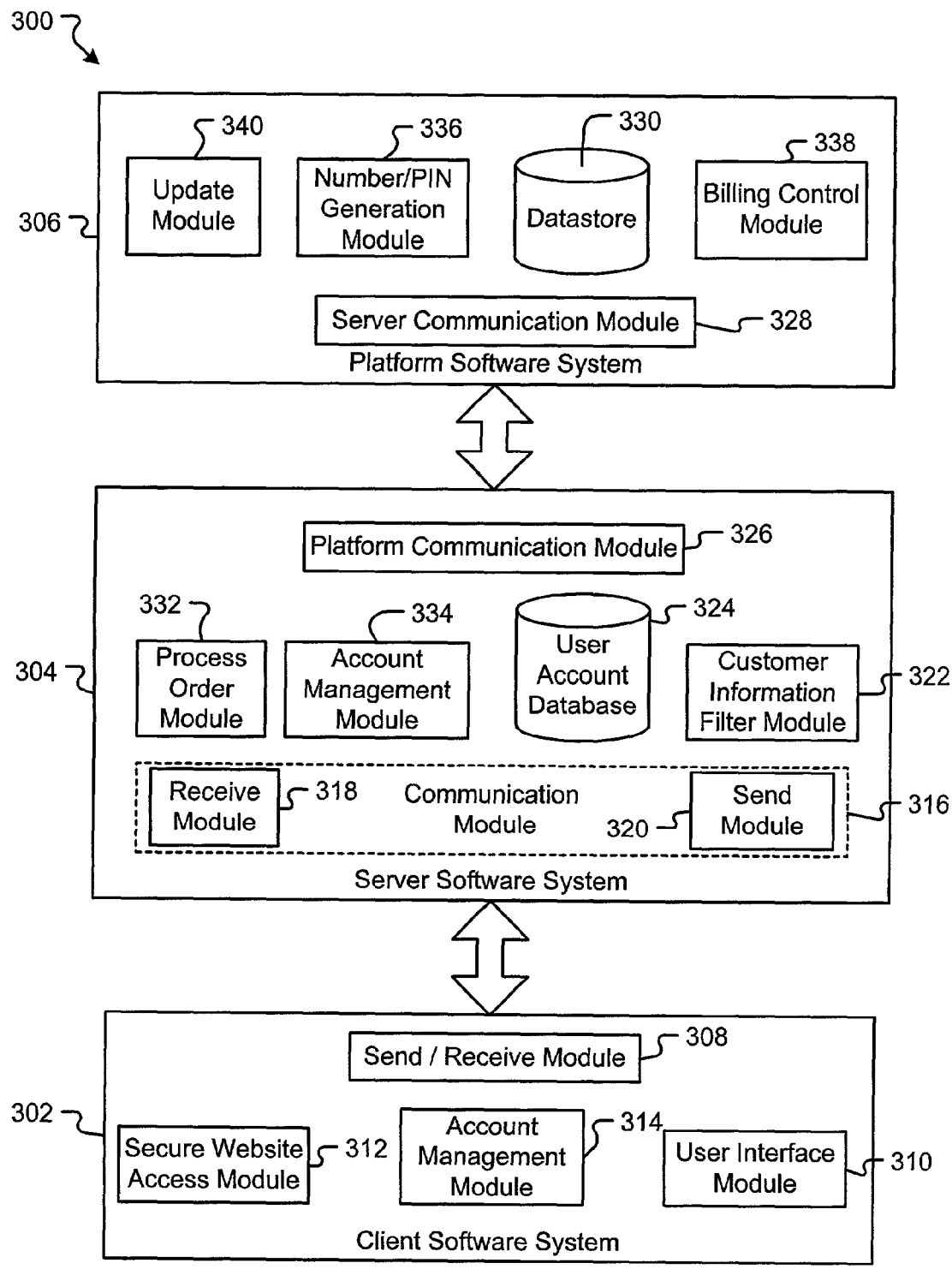
FIG. 3 is a block diagram illustrating functional components of the system shown in FIG. 1 incorporating aspects of the present invention.

FIG. 3 illustrates a software/hardware environment 300 incorporating aspects of the present invention. The environment 300 includes separate modules that perform functional operations in accordance with those aspects. In general, the environment 300 comprises a client computer system or layer of software 302, a server computer system or layer of software 304, and a platform software system 306, which, in one embodiment correspond respectively to client computer system 102, server computer system 104 and platform system 108 shown in FIG. 1. The client layer 302 communicates with the server layer 304 in order to access a secure link and to allow the user of the client system 302 to purchase one or more long-distance, post-paid debit calling cards. The server layer 304, communicates with the platform layer 306 to process purchase requests and other account management functions, as discussed below.

To access the secure link, the client layer 302 has a send/receive module 308 that is used to communicate with the server layer 304. In an embodiment, the send/receive module 308 is a browser module used to send requests and receive documents or other information over the Internet. The client layer 304 may further include a user interface module 310 that is used to interface with the user to provide results back to the user and receive search requests from the user. In an embodiment, the browser module may download other functional modules to the client layer 302, such as secure website access module 312 that provides some functionality on the client layer during the process of accessing the secure website. For instance, the secure website access module 312 might evaluate the client identification information or the client computer system itself against predetermined criteria to aid in the verification process. Alternatively, the module 312 might be used to package specific requests or perform other functions.

Another functional module that might exist on the client system 302 relates to an account management module 314. The account management module 314 might perform some account management functions on the client layer 314, e.g., refresh requests, simple calculations, error checking, etc. The client layer 302 may include many other modules, such as input and output control modules, used in the course of processing and computing other functions. Such other modules are well known in the art and need not be discussed in detail here. Although client layer modules, such as modules 312 and 314 may provide functional capabilities on the client layer 302, other embodiments do not include such modules. In those embodiments, the client layer 302 primarily packages and sends requests to the server layer 304, such that the bulk of the computing is performed on the server 304 or in the platform layer 306, and receives and displays the results.

With respect to the server layer 304, it has a communication module 316 that communicates with the client layer 302. The communication module 316 may include a server receive module 318 for receiving communication requests from the client layer 302, e.g., the send/receive module 308. The communication module 312 may further include a send module 320 designed to package and send search results back to the client layer 302, and in particular, to the module 308.

The server software system 304 incorporates a customer information filter module 322, which is used to evaluate customer information received from the client computer layer 302. The evaluation process is to validate that the client system user has an existing account. The customer information, in an embodiment, relates to a login name and a password. In other embodiments, the customer information may be any other identification information that may be verified by the server layer 302, and in particular the customer information filter module 322. The verification process performed by the customer information filter module 322 may involve the parsing of an access request to glean the customer information. Upon determining the customer information, the customer information filter module 322 may access a user profile database 324 to determine if the information is valid. The database 324 may be within the server computer system, or alternatively, the database, and potentially the verification module, may reside on the platform system layer 306.

In operation, upon validation of the customer information, the server layer 304 establishes a secure link with the client layer 302, e.g., by allowing access to a secure web page. Additionally, upon validation, the server 304 communicates with the platform layer 306 to access the customer or user's overall account information. The server layer 304 uses a platform communication module 326 to communicate with the platform layer, and more specifically, a server communication module 328 located on the platform layer 306. The modules 326 and 328 may communicate across a firewall, and may use one of a number of different known protocols to achieve this communication.

The platform layer 306 has a datastore 330, which stores information for various calling card records or mini-accounts, where each record relates to a platform access number and PIN combination. The datastore 330 maintains the amount of time or money allotted to or remaining for each combination. Each user account, consequently, identifies a list of such records that have been activated and billed to a particular user. Upon validating a user, the user account information is requested for the platform. In one embodiment, a list of all outstanding records is provided to the platform 306 and the platform uses the datastore 330 to provide up-to-date calling card information.

The server layer 304 also has a process order module 332 that processes orders for new calling-card number/PIN combinations. Upon receiving such a request, the process order module 332 communicates with the platform software layer 306 to obtain a new number/PIN combination. The platform layer 306 has a number/PIN generation module to generate such a combination and return the information to the server layer 304. Once generated, the combination is stored in the datastore 330. Importantly, the process order module 332 does not process an order for long-distance services, such as calling card requests, unless or until the customer information has been verified. In this manner, a calling card number/PIN combination can be provided to a user and the user is then billed in accordance with normal and customary billing practices, e.g., once a month, along with the bill for other services, such as their regular long distance service bill.

The server layer 304 may also have an account management module 334. In an embodiment, the account management module 334 provides the user the ability to manage multiple account elements, such as home-telephone service bills, multiple different calling cards, etc. Indeed, the account management module may allow a customer to shift pre-paid calling card time from one calling card to another. Since the time is billed to the customer on the customer's next monthly telephone bill, the customer has the convenience of being able to move time or services without entering a credit-card number each time. Further, the account management tool 334, in an embodiment, accesses the information in the datastore 330 on a regular basis such that user may understand the current balance on each account.

In accordance with these features, the platform layer 306 has a billing control module 338 and an update module 340. The billing control module 338 charges a user account each time a number/PIN combination has been created. Alternatively, the billing control module 338 communicates charge information to the server layer 304 which then adds the charge to the user's bill. The server layer may then send a message to an accounting system (not shown) or some other module used to generate the actual bill that is delivered to the user. This bill displays the user's account activity, such as pre-paid calling card purchases and other services rendered, along with the charges associated with the account activity. The user then pays these charges using known methods, such as with an Internet payment system, mailing a bank check, using a credit card, etc.

With respect to the update module 340, the module is used to update the datastore 330 when a number/PIN combination is used. During a long-distance phone call associated with a number/PIN, the update module 330 may temporarily freeze account management capabilities and then update or debit the time associated with the number/PIN combination in the datastore 330. Consequently, the next time the data from the datastore is accessed either by the account management tool 334 or during a phone call, the correct, updated information is available.

Figure 4:
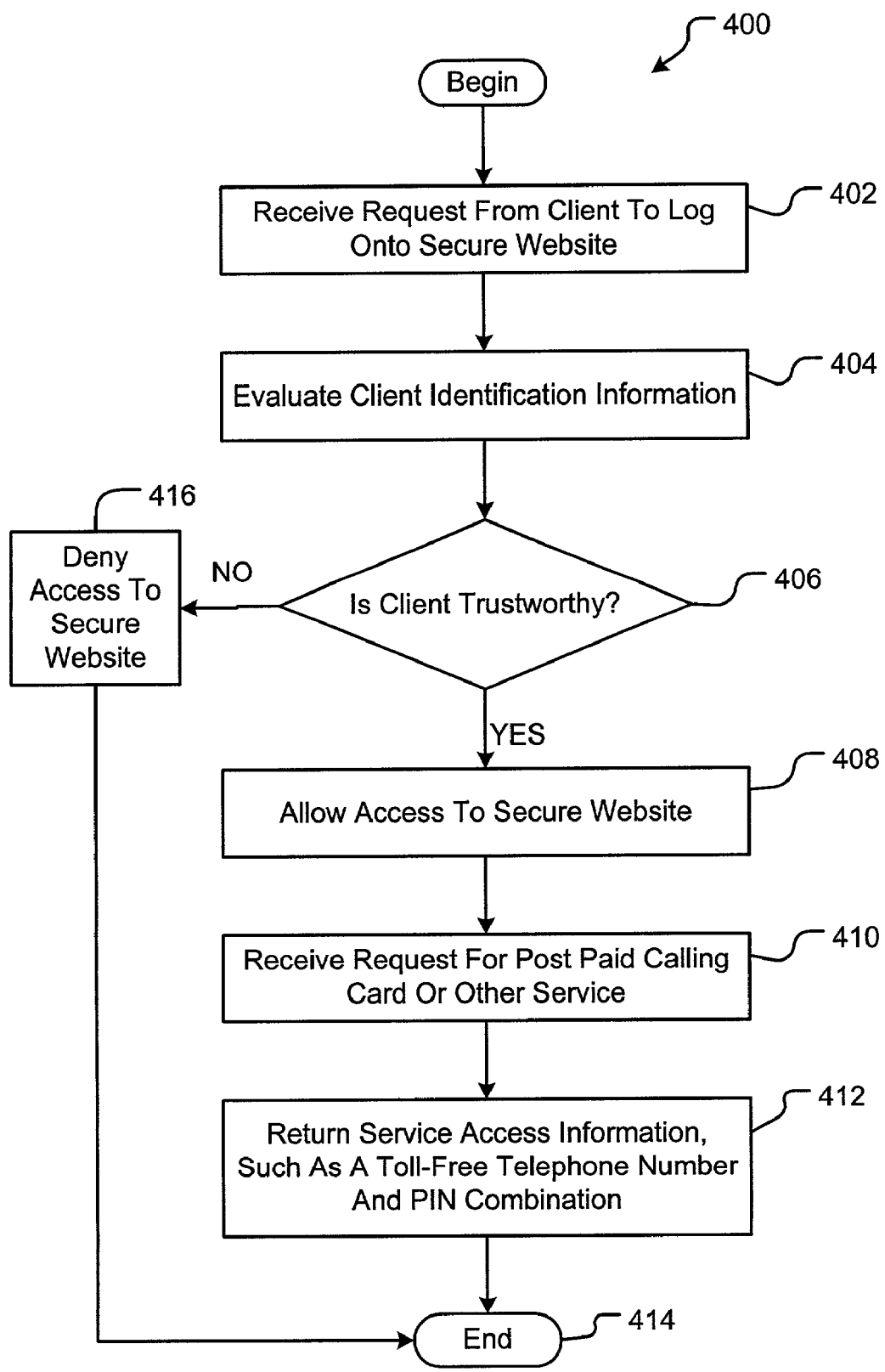
FIG. 4 illustrates a flowchart of functional operations related to receiving requests from a client system such as the client system shown in FIG. 1 and responding to such requests from the client to provide long distance service options in accordance with an embodiment of the invention.

FIG. 4 illustrates a flowchart of functional operations related to the receiving requests from a client system such as the client system shown in FIG. 1 and responding to such requests from the client to provide long distance service options in accordance with an embodiment of the invention. Initially, flow 400 begins with receive operation 402. Receive operation 402 receives a request from the client, such as from the client computer system 102 (FIG. 1). The request indicates that the client desires to log onto or gain access to a secure link, such as a secure website. Many known methods of communication may be used to transfer this request to the sever computer system.

Upon receiving the request, evaluate operation 404 evaluates the request to determine whether the client identification information is valid. That is the client must send some identification information such that the server can make the determination as to whether the client is able to gain access to the secure website. Indeed, upon evaluating the information, determination operation 406 determines whether the client is trustworthy. Typically, the server maintains a log or record of client information and is thus able to check the received client information against a list of trusted client information to make this determination.

If determination operation 406 determines that the client is trustworthy, then flow branches YES to allow operation 408. Allow operation 408 allows the client to access the secure website. Stated another way, allow operation 408 establishes a trusted or secure link between the client and the server. Many known methods may be employed in establishing this link and thus providing access to the secure website. In one embodiment, a web page is displayed at the client location, where the web page includes client-specific information, such as account information. The web page, therefore, may be deemed a personalized web page for that user. The web page may further include options that allow the user to select or request services. In a particular embodiment, the web page provides a selection option that allows the user to purchase a calling card number/PIN combination. The web page may allow the user to choose one of two or more payment options. One particular option relates to having the charge for the calling card appear on the user's next statement. Other embodiments require this type of billing arrangement.

Flow 400 continues as the server receives, at receive operation 410, a request to purchase a calling card or other service. Details of the functional operations following receipt of the request for a post-paid debit calling card are detailed below in conjunction with FIG. 5. Assuming the request to purchase a calling card number/PIN combination has been fulfilled by the server, return operation 412 returns, within the web page, the service access information, such as the toll free number and PIN combination. Alternative embodiments may mail this information to a physical address. In yet another embodiment, the bill is provided electronically by either providing an electronic version of the bill online or by sending an electronic version of the bill via email. Once the information is returned to the user, the account is charged and any future account-information requests will reflect this purchase. Following return operation 412, flow 400 ends at end operation 414.

Referring back to determination operation 406, if it is determined that the client is not trustworthy then flow branches NO to deny operation 416. A client may be deemed untrustworthy if the login name and password (or other identification information) does not match any of the known information on the server system. Alternatively, the client may be deemed untrustworthy if no credit information is available and nothing can be verified at the time, e.g., when setting up a new client for example. In yet other embodiments, the client may be denied access if the client or user is delinquent in paying their bills or for some other reason locked out of the system.

Deny operation 416 may return a message to the client indicating that access has been denied. In some embodiments, the message may indicate the reason for such denial and may even provide help tips to the user as to how to rectify the situation. For example, the message may state that the user must re-enter the client identification information because no match was found. Or the message may indicate that the user is delinquent in paying their bills and provide a phone number for future help to the user. Upon denying access, flow 400 ends at end operation 414.

Figure 5:
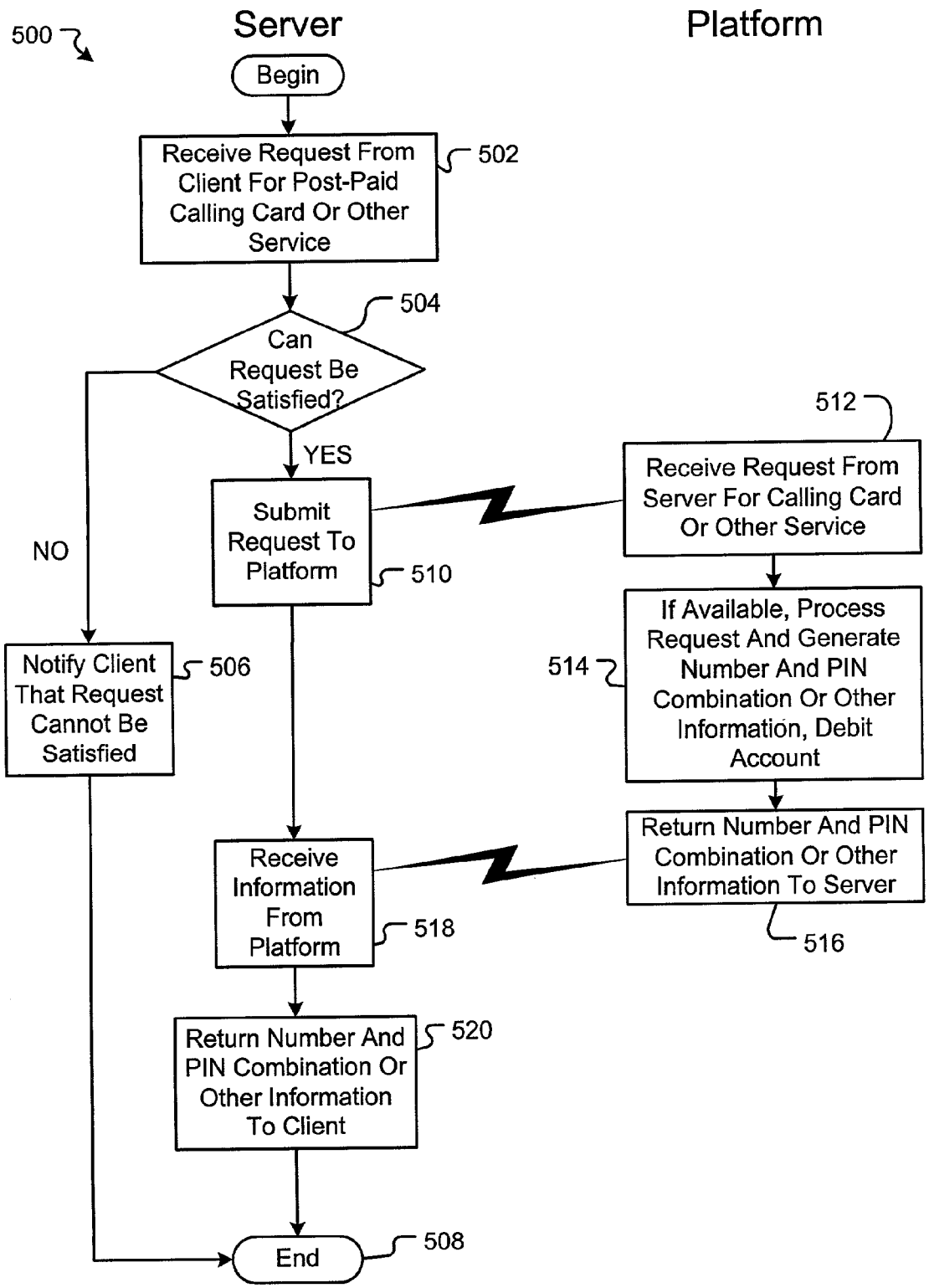
FIG. 5 illustrates a flowchart of functional operations related to server-side operations in processing requests for long-distance service, in accordance with a particular embodiment of the invention.

FIG. 5 illustrates a flowchart of functional operations related to server-side operations in processing requests for long-distance service, in accordance with a particular embodiment of the invention. Flow 500 begins with receive operation 502, which receives a request, such as from a client, for a post-paid debit calling card or other service information. In one embodiment, the receive operation 502 is the same as receive operation 410 described above in conjunction with FIG. 4.

Upon receiving the request, determination operation 504 may determine whether the request can be satisfied. Determination operation 504 provides a means to check almost any predetermined criteria, at the server level, to determine if the service should be denied for some reason, even though the user has been granted access to a secure site. This determination operation may, for example, establish a limit on the number or amount of post-paid debit calling card minutes a single user may purchase at one time. Determination operation 504 may further request other identification information for security reasons. Alternative embodiments may choose to exclude determination operation 504, essentially assuming that if the user is granted access to a secure website, then that user may purchase calling card information.

Assuming determination operation 504 is employed, if it is determined that the request cannot be satisfied, then flow branches NO to notify operation 506, which notifies the user that the request cannot be satisfied. The notification request may provide the reason why the request cannot be satisfied and may further provide tips to the user indicating options for rectifying the situation. Upon notifying the user that the request cannot be satisfied, then flow 500 ends at end operation 508.

On the other hand, if the request can be satisfied, as determined by determine operation 504, then flow branches YES to submit request operation 510, which submits a request to the platform software layer, such as layer 306 shown in FIG. 3. The request may be submitted in many different ways to the platform layer, such via the Internet or by a more secure link, using any number of different protocols.

Following submit operation 510, receive operation 512 receives the request at the platform layer. The request is then parsed and evaluated for processing. Process operation 514 processes the request, and if available, generates a number/PIN combination for the user. Process operation 514 may also send a message to an accounting module to bill the user for the combination. Upon processing the request, return operation 516 returns the number/PIN combination to the server.

In response to return operation 516, the server receives, at receive operation 518, the information from the platform. Return operation 520 then sends the number and PIN combination to the user. Additional processing may take place at this point, such as billing or other account management duties. Upon sending the information to the client, flow 500 ends at end operation 508.

It will be clear that the present invention is well adapted to attain the ends and advantages mentioned as well as those inherent therein. While a presently preferred embodiment has been described for purposes of this disclosure, various changes and modifications may be made which are well within the scope of the invention. Numerous other changes may be made which will readily suggest themselves to those skilled in the art and which are encompassed in the spirit of the invention disclosed and as defined in the appended claims.

What is claimed is:

1. A method of providing a new communication service to a user, the method comprising:
   receiving a request to purchase the new communication service, the new communication service comprising a post-paid debit account;
   receiving user identification information on the user;
   determining whether the user is trustworthy by validating the user identification information; and
   upon determining that the user is trustworthy based on the user identification information, providing the user with communication service access information so that the user can use the new communication service.

2. The method as defined in claim 1 wherein determining if the user is deemed trustworthy comprises receiving user identification information that establishes that the user has an existing account.

3. The method as defined in claim 2 further comprising billing the user for the new communication service.

4. The method as defined in claim 3 wherein billing the user comprises sending a bill to an e-mail address.

5. The method of claim 2, wherein determining that the user is trustworthy comprises determining that the existing account has a positive billing history.

6. The method as defined in claim 1 wherein receiving the request comprises receiving a telephone call containing a platform access number and a personal identification number.

7. The method as defined in claim 1, wherein receiving the request comprises receiving the request from a remote computer system over a network and wherein the request initially requests a secure link.

8. The method as defined in claim 7, wherein receiving the request comprises receiving the request over the secure link which is a secure web page and receiving the request further comprises receiving user identification information having a login name and a password.

9. The method as defined in claim 8, wherein receiving the request comprises receiving the request using the web page that comprises account management functions, the account management functions providing account balance transfer options between the post-paid debit account and an existing account.

10. The method of claim 1, further comprising billing the user in a predetermined manner for the communication service and for other services associated with an existing account.

11. The method of claim 1, wherein determining whether the user is trustworthy comprises determining if the user has an existing physical billing address for a separate account.

12. The method of claim 1, wherein determining whether the user is trustworthy comprises determining if the user has an existing email address.

13. The computer system of claim 1, wherein the new communication service comprises a long distance telephony service.

14. The method as set forth in claim 1, wherein the post-paid debit account provides a limited amount of communication services for predefined period of time.

15. A computer system for providing new communication service to a user, the system comprising:
 a receive module for receiving a request for the new communication service;
 a customer filter module for receiving customer identification information and for determining whether the user is trustworthy by identifying a pre-existing communication service from the customer information;
 a process order module for processing the request for the new communication service after the customer filter module has determined that the user is trustworthy, the new communication service being a post-paid debit communication; and
 a communication module for enabling the post-paid debit communication service in response to the request.

16. The computer system as defined in claim 15, further comprising a platform layer for providing the new communication service in response to the request received through the communication module and wherein the platform layer receives a telephone call including a platform access number and a personal identification number prior to providing the new communication service.

17. The computer system of claim 15, further comprising a billing module for billing the pre-existing account according to the predetermined method of billing.

18. The computer system as defined in claim 17, wherein the billing module sends a bill to a physical location.

19. The computer system as defined in claim 17 wherein the billing module provides an electronic version of a bill.

20. The computer system as defined in claim 19, wherein billing module provides the electronic version of the bill online.

21. The computer system as defined in claim 19, wherein the billing module sends the electronic version of the bill via email.

22. The computer system of claim 15, wherein the process order module determines if an account associated with the pre-existing communication service has a positive billing history.

23. The computer system of claim 15, wherein the new communication service comprises a long distance telephony service.

24. The method as set forth in claim 15, wherein the post-paid debit communication a limited amount of communication services for predefined period of time.

25. A method of providing a trustworthy communication service to a user, the method comprising:
 receiving from a user a request to purchase the trustworthy communication service, the trustworthy communication service comprising a post-paid debit account;
 receiving user identification information;
 determining whether the user is trustworthy by evaluating the user identification information; and
 upon determining that the user is trustworthy, providing the user with communication service access information, wherein the communication service access information permits the user to access the trustworthy communication service.

26. The method as set forth in claim 25, wherein the trustworthy communication service comprises a telephony service.

27. A method of providing a new trustworthy communication service to a user, the method comprising:
 receiving a request to purchase the new trustworthy communication service, the new trustworthy communication service comprising a post-paid debit account;
 receiving user identification information;
 determining whether the user identification information is trustworthy by comparing the user identification information to a list of trusted user information; and
 upon determining that the user identification information is trustworthy, providing the user with communication service access information so that the user can access the new trustworthy communication service from a communication device.

28. The method as set forth in claim 27, wherein the trustworthy communication service comprises a telephony service.

* * * * *